United States Patent
Shutt et al.

(10) Patent No.: US 7,058,958 B1
(45) Date of Patent: Jun. 6, 2006

(54) CLIENT PROGRAMMING MODEL WITH ABSTRACTION

(75) Inventors: David Shutt, Seattle, WA (US); Bradley J. Barrows, Redmond, WA (US); Suwat Chitphakdibodin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 10/128,060

(22) Filed: Apr. 23, 2002

(51) Int. Cl.
*G06F 17/30* (2006.01)

(52) U.S. Cl. .......................... 719/328; 707/1; 709/217; 711/100

(58) Field of Classification Search ................ 719/328; 707/1–10, 100, 201; 714/100; 709/217; 711/100
See application file for complete search history.

(56) References Cited

U.S. PATENT DOCUMENTS

| | | | |
|---|---|---|---|
| 5,649,168 A * | 7/1997 | Huang et al. .................. | 703/23 |
| 6,754,679 B1 * | 6/2004 | Oheda .......................... | 707/201 |
| 2002/0103967 A1 * | 8/2002 | Brower et al. ............... | 711/114 |
| 2002/0129214 A1 * | 9/2002 | Sarkar ......................... | 711/162 |
| 2002/0188800 A1 * | 12/2002 | Tomaszewski et al. ...... | 711/112 |
| 2003/0018850 A1 * | 1/2003 | Landau ........................ | 711/114 |
| 2003/0191916 A1 * | 10/2003 | McBrearty et al. ......... | 711/162 |

OTHER PUBLICATIONS

Fox, A. et al "Cluster-Based Scalable Network Services" published Oct., 1997, pp. 78-91.*

Zhou, Y. et al "Fast Cluster Failover Using Virtual Memory-Mapped Communication," published May, 1999, pp. 373-382.*

Candan, K.S. et al., "Enabling Dynamic Content Caching for Database-Driven Web Sites", *Proceedings of the 2001 ACM SIGMOND International Conference on Management of Data*, 2001, Santa Barbara, California, 532-543.

Carreira, J.V. et al., "Dependable Clustered Computing", *High Performance Cluster Computing: Architectures and Systems*, vol. 1,1999, 94-115.

Chase, J.S. et al., "Managing Energy and Server Resources in Hosting Centers", *Proceedings of the 18th ACM Symposium on Operating Systems Principles*, 2001, Banff, Alberta, Canada, 103-116.

Dove, K. "Expanding Options for Clustering", *Linux Journal*, 2001, Issue 82es, Article No. 8, 3 pages.

Fox, A. et al., "Cluster-Based Scalable Network Services", *Proceedings of the Sixteenth ACM Symposium on Operating Systems Principles*, 1997, Saint Malo, France, 78-91.

Lahiri, T. et al., "50,000 Users on an Oracle8 Universal Server Database", *Proceedings of ACM SIGMOD International Conference on Management of Data*, 1998, Seattle, Washington, 528-530.

(Continued)

*Primary Examiner*—William Thomson
*Assistant Examiner*—Qing-Yuan Wu
(74) *Attorney, Agent, or Firm*—Woodcock Washburn LLP (57) ABSTRACT

A client programming model with abstraction hides from an underlying client application or application program interface (API) the details of where each element of data is located, and which copy of the data is resident on an available server and associated databases. The model wraps a database, such as a virtual database, and provides data-dependent and application-dependent routing, failover, and operational administration.

25 Claims, 8 Drawing Sheets

OTHER PUBLICATIONS

Lewis, P. "A High-Availability Cluster for Linux", *Linux Journal*, 1999, Issue 64es, Article No. 25, 11 pages.

Stonebraker, M. et al., "Content Integration for E-Business", *Proceedings of the 2001 ACM SIGMOD International Conference on Management of Data*, 2001. Santa Barbara, California, 552-560.

Zhou, Y. et al., "Fast Cluster Failover Using Virtual Memory-Mapped Communication", *Proceedings of the 1999 International Conference on Supercomputing*, 1999, Rhodes, Greece, 373-382.

Zhuang, S.Q. et al., "Bayeux: An Architecture for Scalable and Fault-tolerant Wide-area Data Dissemination", *11th International Workshop on Network and Operating Systems Support for Digital Audio and Video*, 2001, Port Jefferson, New York, 11-20.

* cited by examiner

CLIENT PROGRAMMING MODEL WITH ABSTRACTION

FIELD OF THE INVENTION

This invention relates in general to the field of software. More particularly, this invention relates to a client programming model that provides an abstraction over applications for scale-out and failover services for data access.

BACKGROUND OF THE INVENTION

A problem faced by many Web services and other applications today is to achieve very high scale and very high availability at the same time, while keeping operational and capital costs low. This problem is particularly challenging when the application needs to dynamically update stateful databases such as SQL databases. For stateful databases, at high volumes of data and/or high transaction rates, having many identical copies of all the data is not technically or economically feasible. The brute force approach of "all data everywhere" would consume too much disk space, and transaction rates would be too rapid for disk, server, and network bandwidth.

Hence, each piece of data must be located on only a small subset of servers, and an application must route each request to one of that subset of servers that has the desired data, plus handle failover to another server if the first choice is not available. In addition, there are significant operational challenges to monitor and administer large numbers of middleware and backend servers.

In view of the foregoing, there is a need for systems and methods that overcome the limitations and drawbacks of the prior art.

SUMMARY OF THE INVENTION

The present invention overcomes these problems by providing a client programming model with abstraction that hides from an underlying client application or application program interface (API) the details of where each element of data is located, and which copy of the data is resident on an available server and associated database(s).

An embodiment of the present invention is directed to an API that wraps a database, such as a virtual database, and provides data-dependent and application-dependent routing, failover, and operational administration.

According to aspects of the invention, the abstraction provides transparent failover, load balancing, and remote administration features. In this manner, the underlying application developer does not need to code those features.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

It is desirable to have multiple complete copies of data constantly available, and the ability to scale-out a problem if it is too big to be handled by one server. The present invention is directed to a client programming model, application, or API that acts as an abstraction over applications to provide replicas of data along with data location and data freshness, without having to change the underlying applications that initially request the data. The present invention provides failover, routing, and monitoring services for data access. It is applicable to any service (such as Internet-scale services or massively scalable applications such as Web services) that has requirements for high transaction rates and/or 24×7 availability, which accesses structured storage such as SQL. These requirements are common on Internet-scale services today and will continue to be so in the future. By abstracting or otherwise hiding the details of storage, inexpensive commodity hardware can be used instead of specialized/expensive technology to achieve these goals.

The present invention can be implemented in a variety of languages and tools such as C, SQL, OLE DB, and Managed Code, produced by Microsoft Corporation of Redmond, Wash. The present invention is application schema neutral and works with Windows2000 and SQL2000, for example. Moreover, the invention can be used with other languages, tools, Web services, applications, and APIs, for example.

An application database setup automates the process of allocating logical and physical partitions across a set of servers, creating databases, installing application objects in the databases, and configuring replication between the database instances when desired. The present invention supports deployment-time choice of different levels of redundancy, as appropriate for different business and user desires.

An administration console provides a user interface (e.g., html-based) to administer operations such as taking servers offline with minimal disruption to live service, and adding servers to scale-out a site (repartition). The administration console has an extensive set of remote administration functions to manage client library instances.

Exemplary Computing Environment

Figure 1:
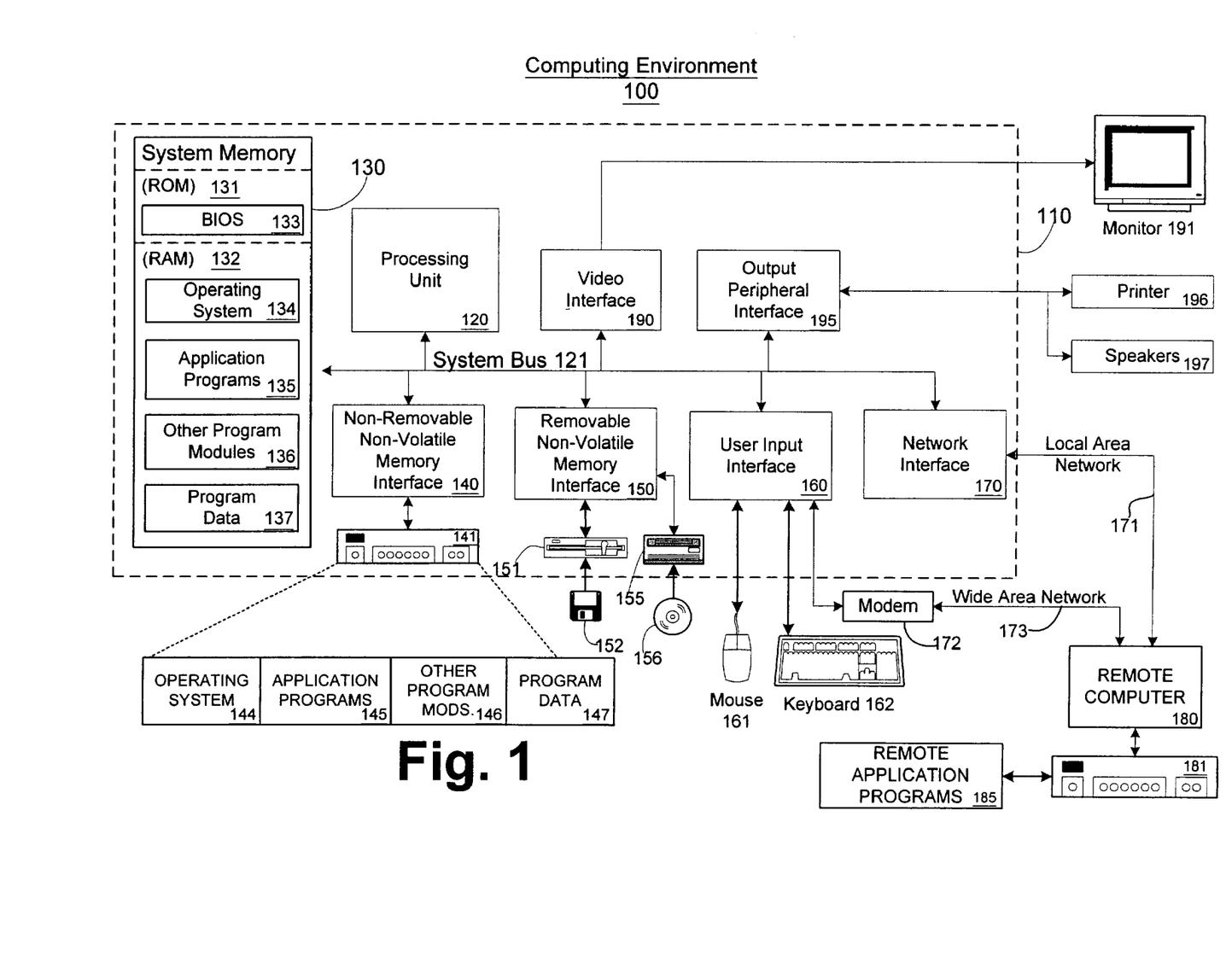
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage, and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that abstraction services may be performed by, supported in, or accessed via a variety of languages and services, and in other distributed computing frameworks as well.

Exemplary Embodiments

Figure 2:
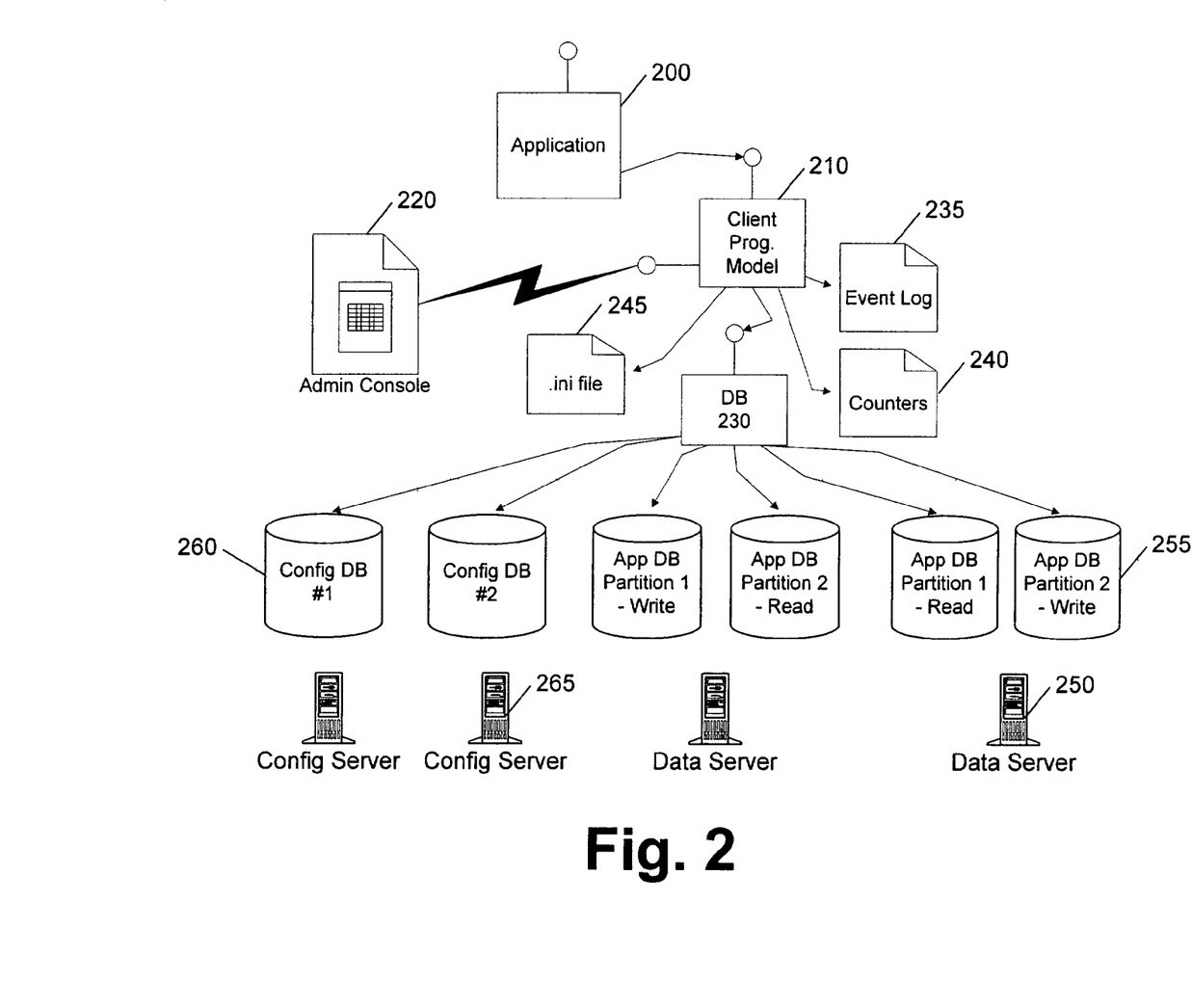
FIG. 2 is a block diagram of an exemplary system in accordance with the present invention.

FIG. 2 is a block diagram of an exemplary system in accordance with the present invention. An application 200 (also referred to herein as a client application) requests data, and this request is provided to the client programming model 210. A configuration database 260 is accessed by the client programming model 210 and provides the topology of the various data servers 250 and databases 255 to the client programming model 210. The client programming model 210 wraps the databases 255, 260 as a virtual database 230. In other words, the model 210 views the application data servers 250 and configuration servers 265 as one virtual database with multiple databases 255, 260 hidden behind it. The virtual database 230 of the present invention can be divided up between different data centers and different switches, as described further with respect to FIG. 3. It is contemplated that servers 250 can reside in multiple data centers.

An event log 235, counters 240, and an .ini file 245 containing configuration information are also provided and are described further below.

The administration console 220 is in communication with the configuration database(s) 260, and retrieves the topology from the configuration database(s) 260, which are served by configuration server(s) 265. The configuration database(s) 260 preferably contains the topology of the data servers 250 and databases 255 (i.e., how the data servers are laid out and related to each other). In the configuration database 260, there is a mapping of the logical partitions ranges to the physical partitions (which is a list of servers and databases).

The administration console 220 provides a user interface (e.g., HTML-based) to administer operations such as taking servers offline with minimal disruption to live service, and adding servers to scale-out a site (repartition). Scale-out refers to growing the server count of a particular application server group beyond one server. Usually this new server has the exact specification as sister servers and increases the number of processors that can handle requests for an application. Scale-out provides increased availability and deployment flexibility because one or more servers can be removed from service for updates or repairs.

The administration console 220 preferably comprises an extensive set of remote administration functions to manage client library instances. The administration console is provided to manage servers (e.g., promotes/demotes read/write database, marks the server/database off, on, readonly, adds server and moves data, changes accounts). The administration console 220 manages clients by refreshing, checking connectivity, and tracing, for example, and further coordinates the logical to physical remap. Operators can adjust the behavior of the client programming model 210 through the administration console 220. Although one administration console 220 is illustrated, it is contemplated that multiple administration consoles can be implemented to provide further redundancy.

Figure 3:
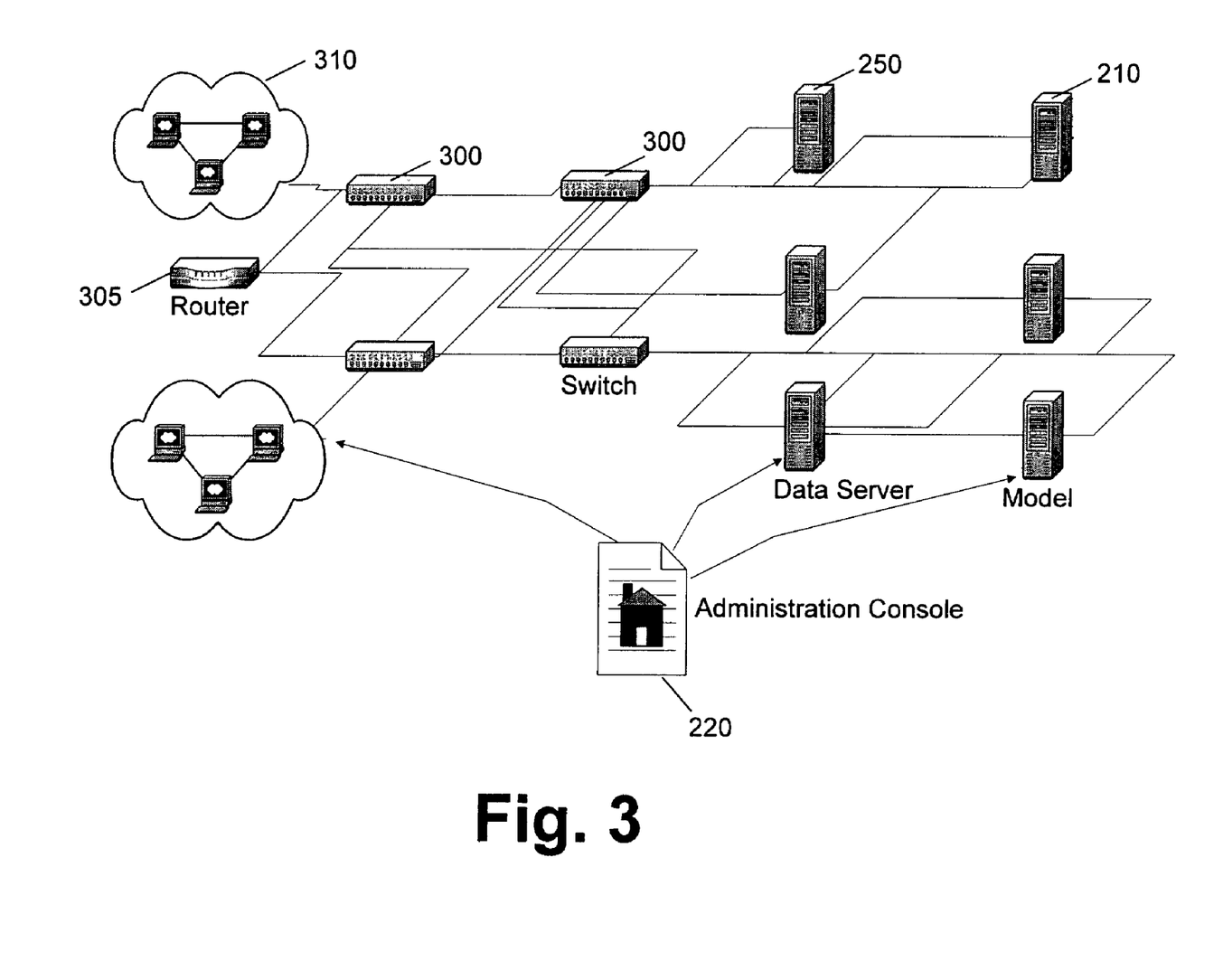
FIG. 3 is a block diagram of an exemplary network architecture in accordance with the present invention.

FIG. 3 is a block diagram of an exemplary network architecture in accordance with the present invention. This architecture provides hardware and software redundancy and scale-out. The programming model 210 is provided at the back end. Multiple client programming models 210 are shown in FIG. 3, which indicates that one or more client programming models can be implemented in a network in accordance with the present invention.

Network switches 300 are implemented to provide further redundancy of the data stored on servers 250. The switches 300 can be connected to a router 305 for a local area network and can also be connected to an Internet information server (IIS) or middleware cluster 310. Preferably, data is allocated or replicated across switches so that if one or more servers are unavailable (e.g., having failed or been taken offline for maintenance), the remaining servers have copies (i.e., replicas) of all of the data. Therefore, a data request by an application can be fulfilled by at least one server. Preferably, a replica is on a different switch so if a switch fails, the data is still available. There are multiple network switches, each having one or more database servers with various databases stored therein. In this manner, automatic failover is provided along with emergency sync replicas. The number of replicas desired over a number of switches can be selected based on the level of protection desired.

The administration console 220 provides administrative functions and other information, such as database topology to the IIS or middleware cluster 310, the data servers 250, and the client programming model(s) 210.

A client library is provided for use in conjunction with the client programming model 210. The client library is preferably a dynamic link library (DLL) comprising executable functions or data.

An application database setup (not shown) automates the process of allocating logical and physical partitions across a set of servers, creating databases, installing application objects in the databases, and configuring replication between the database instances when desired. The present invention supports deployment-time choice of different levels of redundancy, as appropriate for different business and user desires.

The model 210 comprises, for example, a set of SQL objects (tables, stored procedures, etc.) that a client application 200 accesses for data instead of directly accessing a server or database. As described in further detail with respect to FIG. 4, at startup, the model 210 reads the configuration database 260 and caches it locally. More particularly, the model 210 reads the topology from the configuration database 260, so the model 210 can later determine the state of the application data servers/databases (i.e., the virtual database 230 that comprises the multiple switches 300 and database servers 250). From this information, the model 210 determines the data servers/databases 250, 255 that the client application 200 should access to retrieve the requested data. Thus, based on the topology and the state of data servers/databases 250, 255, the model 210 routes the client application 200 to a data server/database 250, 255 that has the requested data and is in a "healthy" state.

Failover to a database on another server is provided, along with autonomous decisions, command and connection time out, and connection pooling. Redundancy is provided so that multiple copies (replicas) of the data resides on multiple database servers. Routing can be data dependent or operation dependent or both.

Figure 4:
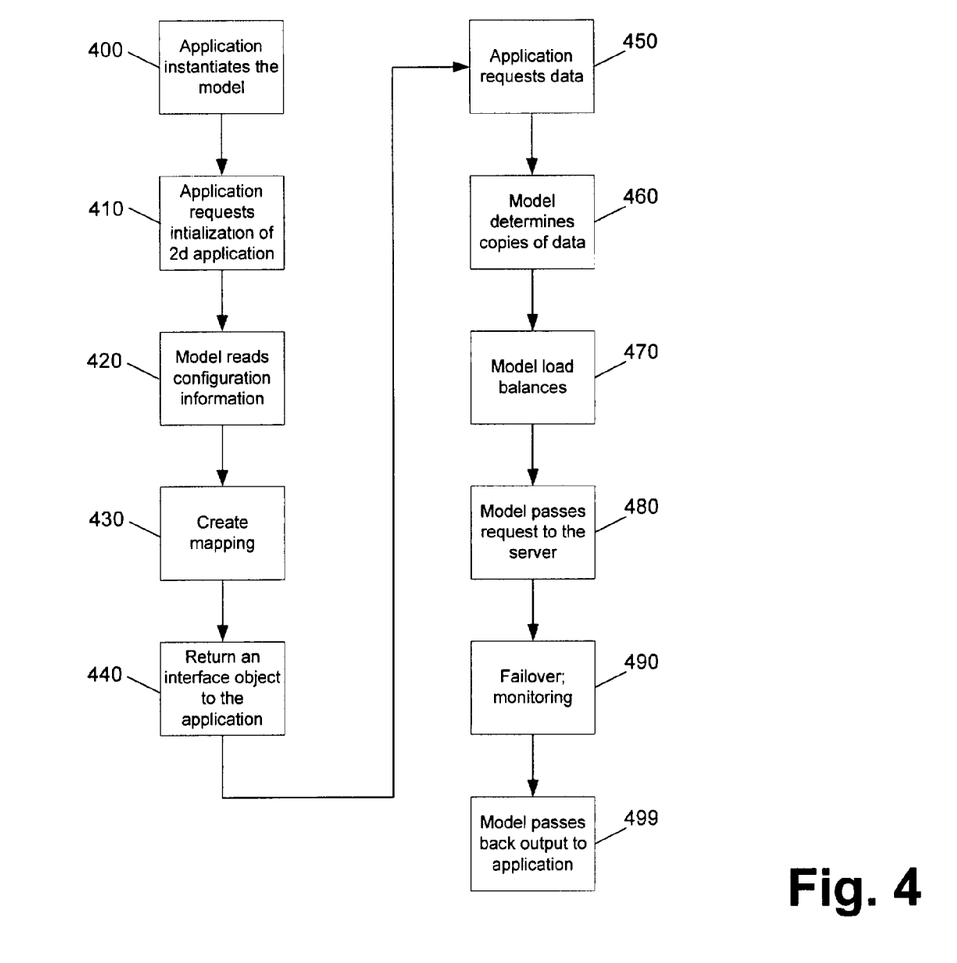
FIG. 4 is a block diagram of an exemplary process in accordance with the present invention.

An example of a method in accordance with the present invention is described with respect to FIG. 4. At step 400, an application (or API, for example) (referred to herein as a client application) instantiates the client programming model. At step 410, the client application requests initialization of a particular second application, such as, for example, a virtual database, a request for data, or a request for a particular partition.

The model then determines the appropriate server to fulfill the client application's request, as described in further detail below. At step 420, the model receives this request from the client application and looks up a particular partition for the client application (or API). In this manner, the model gets a request, and the determines which server and/or database to use, based on the mapping. More particularly, the model reads configuration information from a known location. For example, configuration information is retrieved from a set of centralized configuration databases (e.g., databases 260 in FIG. 2) whose location is indicated in an .ini file (e.g., .ini file 245 in FIG. 2) or registry setting. An alternative implementation could store the information locally.

Using this configuration information, at step 430, the model creates local private data structures reflecting the logical to physical mapping of the data location and the association between replicas of the data. Along with this, a communication mechanism (e.g., TCP/IP port) is desirably opened to support remote administration.

At step 440, the model returns a handle/interface/object to the client application. The client application invokes a method on that interface/handle/object at step 450 to make a specific request to access data (e.g., SQL). The client application indicates the level of consistency and freshness of data that is desired by the request. The client application also indicates the logical data location. The request is then provided back to the model.

At step 460, the model consults its private data structures to map the logical location to a physical location, and to determine which copies of data are candidates to satisfy the consistency required by the request. The model also determines which of those copies of the data are in a healthy enough state to be accessed.

The application code references the database type (e.g., read, write) which is a subset of the database instances. A server set is provided which is a grouping of servers across which a database template is partitioned/replicated. For example, data may be considered stale if more than 10 minutes has elapsed between the time the "publisher" has provided the "subscriber" with data replication. Preferably, staleness does not prevent database access but rather give preference to database that is less stale.

Figure 5:
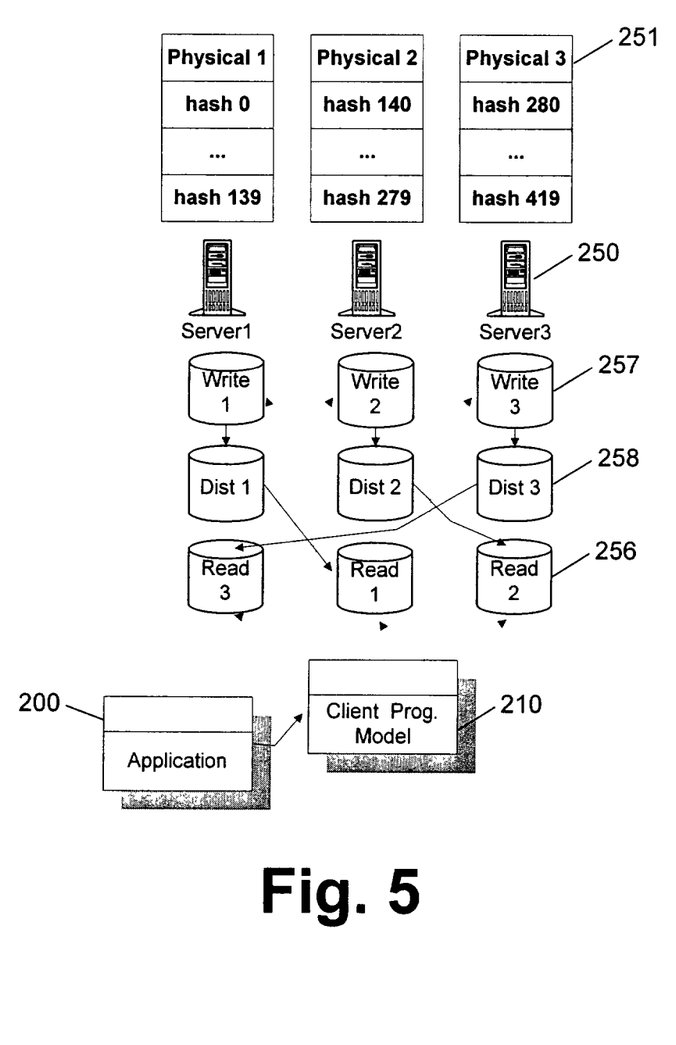
FIG. 5 is a diagram showing an exemplary load balanced topology in accordance with the present invention.

At step 470, if more than one copy of data has potential to satisfy the request, the model load balances among the available copies. FIG. 5 is a diagram showing an exemplary load balanced topology. In such a load balanced topology, each server 250 has a read database 256, a write database 257, and a distribution database 258. Each write database 257 writes to its associated distribution database 258, which in turn provides data to a read database 256 associated with another server (e.g., write database 1 writes to distribution database 1 (both are under server 1) which provides data to read database 1 (which is under server 2). This provides direct request routing from the front end to the appropriate back end. It should be noted that replicas and partitioning can be implemented together or separately.

Also shown above each server 250 in FIG. 5 (and in FIG. 6) is a representation of the physical partitions 251. In partitions 251, different ranges of hashes are shown. These hashes represent an additional (optional) layer of logical to physical mapping. When present, this mapping is used in the rebalancing of data when adding servers to scale-out. Other techniques can be used to determine partitions and add replicas. For example, the application can supply physical partitions to the client programming model by any technique, such as looking it up in a stored mapping or a determined mapping.

At step 480, the model then passes the request through to the server (e.g., the SQL server) it has chosen to provide the data. Preferably, there is maximum number of simultaneous requests to the same server. If this limit is reached, the request is redirected to other available servers that have the data. However, when the number of simultaneous requests to the same server exceeds a predetermined number, but the last good response is within a predetermined timeout period (e.g., 10 seconds), it is determined that the server is not overloaded, and there will not be redirection of the request to another server.

At step 490, the model intercepts errors returned by a lower level (e.g., OLE DB described below) and for those errors which indicate a problem accessing the chosen copy of the data and where another copy is available, the model automatically fails over and retries the application's request on a different copy of the data. The model also checks for data that is available but that is 'stale' and will failover in this case also. In case of a connection failure, a predetermined time, such as 15 seconds, is provided to retry other connections.

Furthermore, the model writes an indication of the problem to monitoring software (e.g., into an event log such as event log 235 shown in FIG. 2) so that operations staff can address the root cause that led to the failover being needed. The number of seconds until the first event log is generated to report a failure to validate a server is preferably a predetermined duration of time, such as 120 seconds.

The model maintains at least one performance counters, such as counters 240 shown in FIG. 2. The model also supports tracing capabilities to save every command and its latency, which can be remotely configured on or off. This logic is thereby abstracted out of the application, resulting in great simplification of application code and reducing the complexity of managing scale-out.

Upon completion of the application request, at step 499, the model passes back any outputs such as a result set and/or return codes to the client application. In this manner, the model insulates the application developer from deployment details and minimizes runtime overhead.

Thus, the invention provides automatic failover using techniques that work with multiple data centers. The primary and replica databases can be physically located in different data centers, and connected over a WAN, for example. Thus, the current invention can protect against failures of individual disks, entire machines, switches, or entire data centers. This assists in monitoring and in minimizing downtime during maintenance, for example.

In accordance with the exemplary process set forth above, a client application is not binded to a particular server or database until execution time—this allows for failover. This is referred to as deployment time binding, instead of development time binding.

Regarding flexibility, the present invention can work with a shared nothing federation (protects against all failures) and/or a shared disk cluster. In shared nothing, there is hot availability in which replication is immediately available. The invention provides failover, operation dependent routing, load balancing, and the ability to hide latency under normal operation (optional). In a shared disk cluster, the nodes of the invention can be shared disk clusters.

Scalability options that are provided by the client programming model include (1) scale-out via partitioning, (2) scale-out via replicas, and (3) scale-out by having many types of databases.

Figure 6:
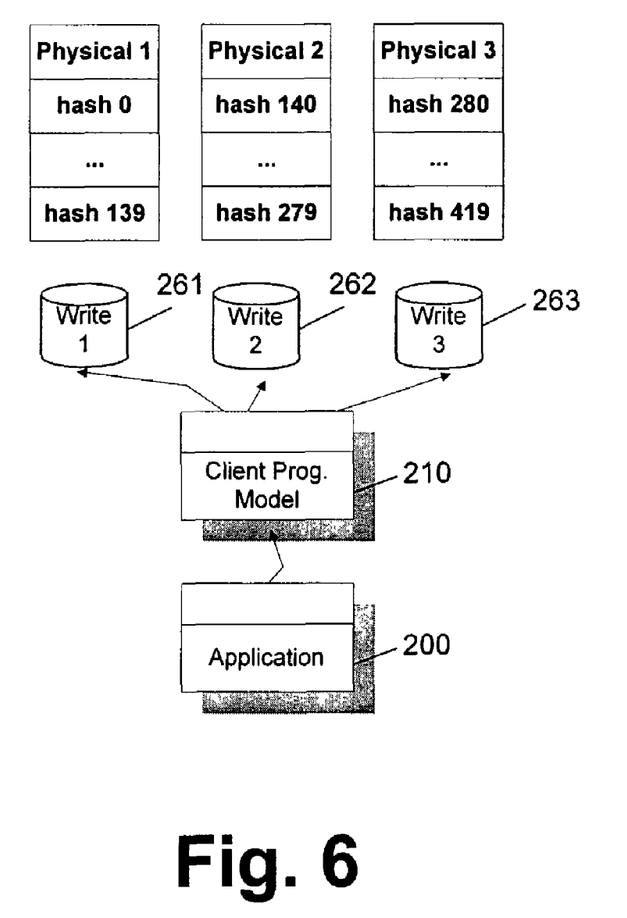
FIG. 6 is a diagram showing exemplary scale-out by partitioning in accordance with the present invention.

FIG. 6 is a diagram showing exemplary scale-out by partitioning. In this example, the model 210 writes out to three different databases 261, 262, 263, each with an associated partitioning, which in turn provides logical to physical partition mapping. The application 200 specifies the logical partition. The model 210 abstracts mapping of logical partitions to physical servers/databases. Partitioning can be performed with or without replicas.

Figure 7:
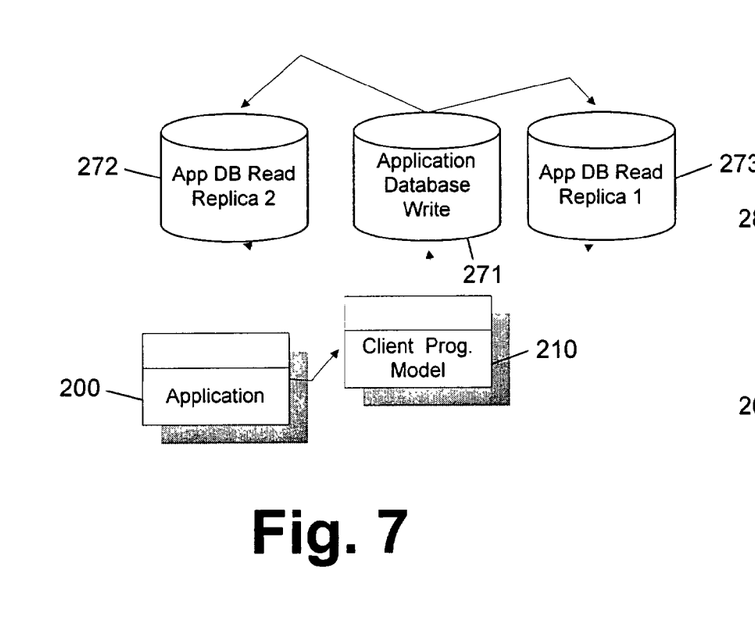
FIGS. 7 and 8 are diagrams showing exemplary scale-out via replicas in accordance with the present invention.
Figure 8:
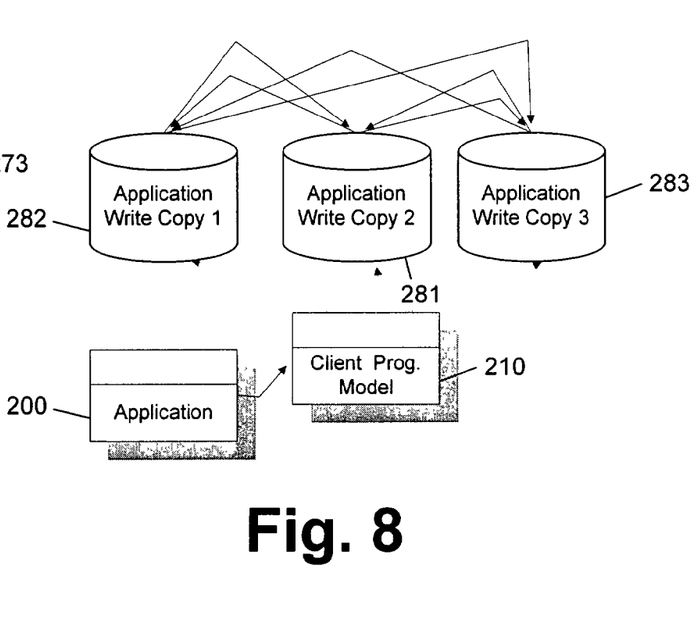

FIGS. 7 and 8 are diagrams showing exemplary scale-out via replicas in accordance with the present invention. Some applications partition poorly in which case it is desirable to use replicas for scale-out. Load balancing can be provided in which the present invention distributes reads and/or writes among replicas. In the example shown in FIG. 7, the database 271 provides replicas to databases 272, 273. In such case, the model 210 can access any of the databases 271, 272, 273 to determine which is healthy enough to provide the data to application 200. FIG. 8 is a diagram showing an exemplary replica with a single master write and multiple reads in accordance with the present invention. In the example shown in FIG. 8, each database provides a replica of its data to the other databases. Similar to the example shown in FIG. 7, the model 210 can then access any of the databases 281, 282, 283 to determine which is healthy enough to provide the data to application 200.

Figure 9:
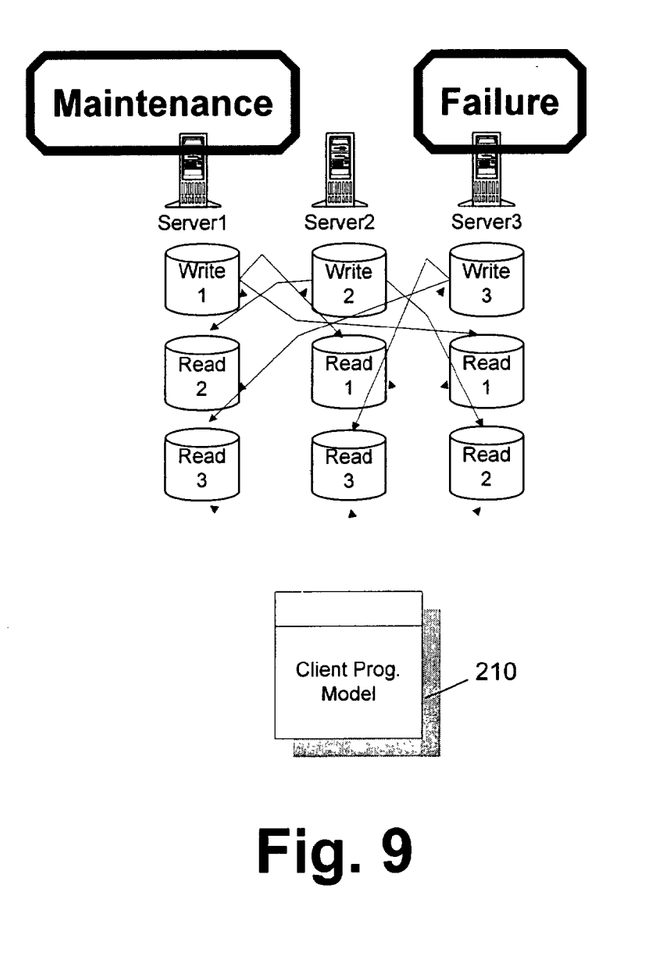
FIG. 9 is a diagram showing an exemplary replica with a single master write and multiple reads in accordance with the present invention.

FIG. 9 is used to show replicas with one write database and multiple read databases. Here, there is a single master write with a variable number of replicas. For example, write database 1 is associated with server 1 and provides read databases 1 associated with servers 2 and 3. Similarly, write database 2 is associated with server 2 and provides read databases 2 associated with servers 1 and 3. There is automatic fail-over of the reads. Thus, if server 1 is down for maintenance and server 3 has failed, then the model 210 can access the desired data from server 2. Because server 2 comprises the data that is found on servers 1 and 3, for example, any data can still be provided to the application.

Figure 10:
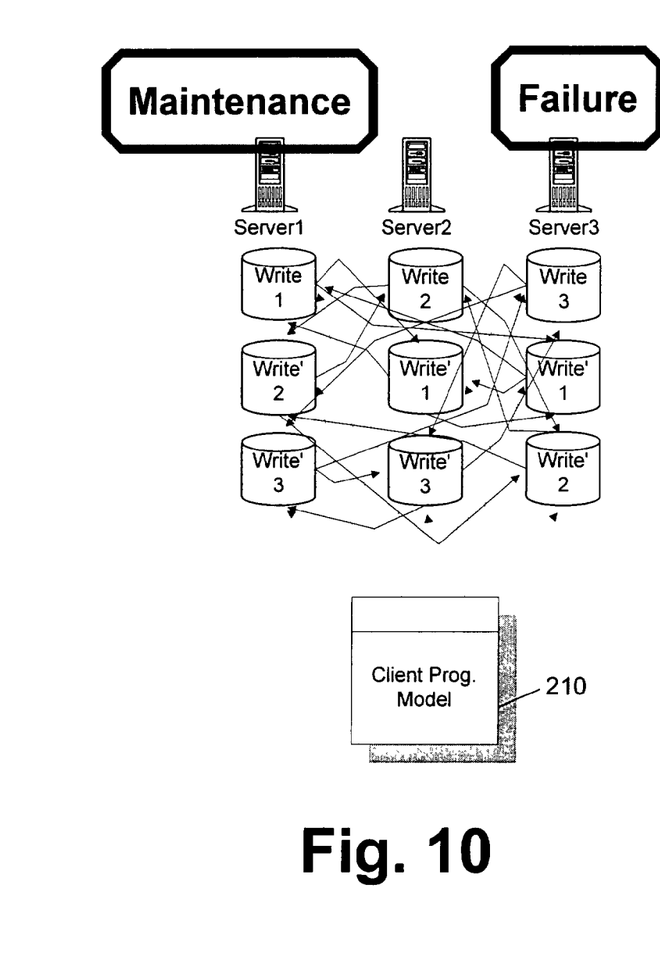
FIG. 10 is a diagram showing an exemplary replica with multiple writers in accordance with the present invention.

FIG. 10 is a diagram showing replicas with multiple writers in accordance with the present invention. There is a multi-master write with a variable number of replicas. There is automatic failover of writes and reads. The application provides conflict resolution logic. In this manner, for example, write database 1 is associated with server 1 and writes to write databases 1' associated with servers 2 and 3. Similarly, write database 1' associated with server 2 writes to write database 1' associated with server 3 and write database 1 associated with server 1.

Exemplary Code and Usage

Managed Code Client Specification

The client programming model can be implemented in the Managed Code Client Specification developed by Microsoft Corporation. Managed code is code that runs under .NET and in cooperation with .NET to take advantage of its services. The .NET platform is designed to sit on top of an operating system, and supplies basic system and application via its Framework, a set of class libraries, thereby allowing components comprising applications to effectively interoperate. Normally, the .NET Framework utilizes managed code for supporting components and their applications, but also supports unmanaged code for lower level interaction with the platform.

Managed code uses the .NET Framework's common type libraries and its metadata "blueprints" for managing components. Managed code means that there is a defined contract of cooperation between natively executing code and the runtime itself. Managed code is written in the language of choice with its own syntax and type rules and its own compiler to map this syntax to the common language runtime, so varying language programming conventions yield identical class behavior.

The client programming model of the present invention can be used in conjunction with a .NET data provider for managed code clients and front end applications which will thinly wrap the SQL Server .NET data provider while providing the additional benefits of the infrastructure (e.g., partitioning abstraction, and automatic command failover support, server connection validation, stale replica detection, etc.).

Preferably, the classes of the present invention shall closely follow the SQL .NET data provider classes (e.g., System.Data.SqlClient namespace) to simplify application migration from existing .NET data providers to the client programming model. Similar to the SqlClient classes (SqlConnection, SqlCommand, SqlDataReader, etc.), the client namespace of the present invention also provides a Connection, Command, DataReader, and Transaction class.

Where the SqlConnection class specifies the specific SQL server, database, and security attributes to establish a connection, the Connection class of the present invention represents a type of virtual connection to a particular application in accordance with the present invention. The particular application comprises partition mapping that specifies the actual physical servers, partitions, and replicas that are available. When a Connection is opened, the configuration for the application specified will be loaded. The actual SqlConnections are not determined until a Command is executed, at which time the partition and CommandType is specified, allowing the Command object to determine the best SqlConnection (server, database) to satisfy that request based on the partition mapping and server state.

The Client data provider classes will implement the standard .NET data provider interfaces (e.g. IDbConnection, IDbCommand, IDataReader), but extend them with extra properties and methods applicable to a model database application (partition, command type, etc.).

OLE-DB API Specification

The client programming model can be implemented in the OLE DB specification which is a specification of how data consumers should communicate with data providers. OLE DB will run on any hardware platform for which COM is available. The Component Object Model (COM) produced by Microsoft Corporation is an example of an object model.

COM is a software architecture for creating and using objects, which makes software easier to write and reuse. In COM, an object is some piece of compiled code that provides some service to the rest of the system. Services are used in a standard way, regardless of location. COM allows an object to expose its functionality to other objects and to host applications. In this manner, COM allows objects made by different software vendors to be combined into a variety of applications.

COM defines a binary standard for component interoperability (e.g., for function calling between components) and is not dependent on any particular programming language. In this manner, binary executables are able to interoperate. Thus, COM can be used with any programming language that uses a binary standard, such as Visual Basic, JAVA, and C++.

In COM, applications interact with each other and with the system through collections of functions called interfaces. A COM interface is a strongly-typed contract between software components to provide a small but useful set of semantically related operations or methods. Thus, in COM, an interface is a related group of functions and is the binary standard through which objects communicate. As noted above, an object can, and typically does, implement more than one interface. Every interface has its own interface, a globally unique ID (GUID).

The goal of OLE DB is to provide an open, extensible standard, allowing any software that conforms to the specification to communicate via a set of common interfaces. OLE DB allows data to be returned to a client application in a structured, tabular format, regardless of the original format and media. OLE DB facilitates access to any data through specific modules and provides an abstraction layer over the underlying data source. With OLE DB, heterogeneous data sources can be integrated without moving a single byte of data from its original. Instead, an intermediate component is built that publishes data in a standardized way. OLE DB provides access to relational and nonrelational data sources. OLE DB can be used to access any data source that can be represented by a row-and-column format. OLE DB comprises three components: the data consumer (e.g., an application); the data provider, which contains and exposes data; and the service component, which processes and transports data (e.g., query processors, cursor engines). OLE DB provides an API that operates against SQL data sources and non-SQL data sources.

From a system perspective, OLE DB is a database middleware, in that it serves as a translator between a client and a server. A consumer is any software that requests an OLE DB interface, while a provider is any software that implements one or more OLE DB interfaces.

The client programming model can be used in conjunction with OLE DB to provide an access to the SQL databases. Internally, it uses OLE DB and maintains its own SQL connection pooling. The characteristics of the SQL pool can be adjusted by changing the client settings of the present invention.

To access an application database, the client programming model first instantiates the main COM object Store. Then, it can query for any specific interface, such as Command: Database Access; Properties: OLE DB Properties; or Hash: Hashing Function.

The client programming model of the present invention also provides session level access to the databases. This ensures multiple queries can be executed on the same OLE DB session.

As mentioned above, while exemplary embodiments of the present invention have been described in connection with various computing devices and network architectures, the underlying concepts may be applied to any computing device or system in which it is desirable to provide abstraction over applications for data access. Thus, the techniques for abstraction in accordance with the present invention may be applied to a variety of applications and devices. For instance, abstraction aspects of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the abstraction aspects of the present invention, e.g., through the use of an API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the abstraction capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A system for providing data access to a client application, comprising:
    a client programming model in communication with the client application to receive a data request from the client application, wherein the data request includes a desired state of data;
    a first database that stores data and is accessible by the client programming model;
    a second database that stores a replica of the data and is accessible by the client programming model;
    an administration console in communication with the client programming model to provide administrative functionality; and
    a configuration database that comprises a topology of the first database and the second database, to provide the topology of the first database and the second database to the client programming model, wherein the topology comprises a mapping of logical partitions to physical partitions in the first database and the second database, the client programming model using the topology to satisfy the data request from the client application, wherein the client programming model is adapted to analyze the first database and the second database to determine which of the first database and the second database to access to satisfy the data request from the client application according to the desired state of data.

2. The system of claim 1, wherein the first database and the second database are wrapped by the client programming model into a virtual database.

3. The system of claim 1, further comprising a first network switch and a first data server associated with the first database and a second network switch and a second data server associated with the second database.

4. The system of claim 3, wherein each of the first network switch and the second network switch is connected to at least one of a router, an Internet information server, and a middleware cluster.

5. The system of claim 1, wherein the administration console is adapted to manage the first database and the second database.

6. The system of claim 1, wherein the administration console is adapted to take a server associated with one of the first database and second database offline, and is further adapted to add a server and database to provide scale-out.

7. The system of claim 1, further comprising an event log for recording a problem, a performance counter, and an initialization file comprising configuration information.

8. The system of claim 1, wherein the client programming model is adapted to provide failover between the first database and the second database.

9. The system of claim 1, wherein the first database resides on a first server disposed in a first data center, and the second database resides on a second server disposed in a second data center, the first data center and the second data center being connected over a wide area network.

10. In a computer system, a method of providing data access to a client application, comprising:
    receiving a client application request at a client programming model, wherein the client application request comprises a desired state of data;
    retrieving, by the client programming model, configuration information of a first database and a second database from a configuration database, the first database comprising data and is accessible by the client programming model, and the second database comprising a replica of the data and is accessible by the client programming model;

generating, by the client programming model, a mapping of the first database and the second database based on the configuration information, wherein generating the mapping comprises mapping logical partitions to physical partitions in the first database and the second database; and satisfying the client application request responsive to the mapping, wherein satisfying the client application request comprises analyzing the first database and the second database, and satisfying the client application request from one of the first database and the second database responsive to the analyzing, wherein analyzing the first database and the second database comprises determining the state of the data in the first database and the state of the replica of the data in the second database and comparing the state of the data and the state of the replica to the desired state.

11. The method of claim 10, wherein receiving the configuration information comprises receiving the topology of the first database and the second database.

12. The method of claim 10, further comprising wrapping the first database and the second database into a virtual database.

13. The method of claim 10, further comprising load balancing responsive to the analyzing.

14. The method of claim 10, further comprising detecting an error in one of the first database and the second database and providing failover between the first database and the second database responsive to the error.

15. The method of claim 10, further comprising monitoring the first database and the second database.

16. The method of claim 10, further comprising providing the first database on a first server disposed in a first data center, and providing the second database on a second server disposed in a second data center, the first data center and the second data center being connected over a wide area network.

17. A computer readable medium having stored thereon computer executable instructions for performing a method of providing data access to a client application, the method comprising:

receiving a client application request at a client programming model, wherein the request includes a desired state of data;

retrieving, by the client programming model, configuration information of a first database and a second database from a configuration database, the first database comprising data and is accessible by the client programming model, and the second database comprising a replica of the data and is accessible by the client programming model;

generating, by the client programming model, a mapping of the first database and the second database based on the configuration information, wherein generating the mapping comprises mapping logical partitions to physical partitions in the first database and the second database; and satisfying the client application request responsive to the mapping, wherein satisfying the client application request responsive to the mapping comprises analyzing the mapping and satisfying the client application request from one of the first database and the second database responsive to the analyzing and according to the desired state of data.

18. The computer readable medium of claim 17, having further computer executable instructions for receiving the topology of the first database and the second database.

19. The computer readable medium of claim 17, having further computer executable instructions for wrapping the first database and the second database into a virtual database.

20. The computer readable medium of claim 17, having further computer executable instructions for load balancing responsive to the analyzing.

21. The computer readable medium of claim 17, having further computer executable instructions for detecting an error in one of the first database and the second database and providing failover between the first database and the second database responsive to the error.

22. The computer readable medium of claim 17, having further computer executable instructions for monitoring the first database and the second database.

23. The computer readable medium of claim 17, having further computer executable instructions for providing the first database on a first server disposed in a first data center, and providing the second database on a second server disposed in a second data center, the first data center and the second data center being connected over a wide area network.

24. A method of communicating between a client application and a second application in a distributed processing system, comprising:

issuing, by the client application, a request for a second application, wherein the request includes a desired state of data;

receiving, by a client programming model, the request for the second application;

issuing, by the client programming model, a request for configuration information of a first database and a second database from a configuration database, wherein the configuration information comprises a mapping of logical partitions to physical partitions in the first database and the second database, receiving, by the client programming model, the configuration information;

analyzing, by the client programming model, the configuration information;

issuing, by the client programming model, a request for data from one of the first or second databases based on the analysis and according to the desired state of data;

receiving, by the client programming model, requested data from one of the first or second databases;

issuing, by the client programming model, the requested data to the client application; and receiving, by the client application, the requested data, the requested data related to the request for the second application.

25. A method of communicating between a client application and a second application in a distributed processing system, comprising:

issuing, by the client application, a request for a second application, wherein the request comprises a desired state of data;

receiving, by a client programming model, the request for the second application;

issuing, by the client programming model, a request for configuration information of a first database and a second database from a configuration database, wherein the configuration information comprises a mapping of logical partitions to physical partitions in the first database and the second database, receiving, by the client programming model, the configuration information;

issuing, by the client programming model, an interface object to the client application responsive to the request for the second application;

issuing, by the client application, a request to access data on the interface object, wherein the request to access data is related to the request from the second application;

receiving, by the client programming model, the request to access data;

analyzing, by the client programming model, the configuration information;

issuing, by the client programming model, a request for data from one of the first database or the second database based on the analysis of the configuration information and according to the desired state of data;

receiving, by the client programming model, requested data from one of the first database or second database;

issuing, by the client programming model, the requested data to the client application; and receiving, by the client application, the requested data, the requested data related to the request for the second application.

* * * * *